United States Patent [19]

De Rossi

[11] E Re. 28,743

[45] Reissued Mar. 23, 1976

[54] STORAGE BATTERIES CONTAINING ZINC HALIDE IN AN AQUEOUS SOLUTION OF THE TYPE HAVING A SOLUBLE CATHODE AND A DISSOLVED ANODE

[75] Inventor: Mario De Rossi, Rome, Italy

[73] Assignee: Consiglio Nazionale Delle Ricerche, Rome, Italy

[22] Filed: Nov. 14, 1973

[21] Appl. No.: 415,499

Related U.S. Patent Documents

Reissue of:

[64] Patent No.: 3,738,870
Issued: June 12, 1973
Appl. No.: 170,697
Filed: Aug. 11, 1971

U.S. Applications:

[63] Continuation-in-part of Ser. No. 856,408, Aug. 9, 1969, Pat. No. 3,625,764.

[30] Foreign Application Priority Data

Apr. 23, 1969 Italy ..... 36614/69

[52] U.S. Cl. ..... 136/22; 136/30; 136/155

[51] Int. Cl.[2] ..... H01M 4/38

[58] Field of Search ..... 136/22, 30, 121, 120, 153, 136/155, 6, 83

[56] References Cited

UNITED STATES PATENTS

| | | | |
|---|---|---|---|
| 2,566,114 | 8/1951 | Bloch | 136/155 |
| 3,328,202 | 6/1967 | Riffe | 136/22 |
| 3,625,764 | 12/1971 | DeRossi | 136/22 |
| 3,658,593 | 4/1972 | Caiola et al. | 136/6 |

*Primary Examiner*—John H. Mack
*Assistant Examiner*—C. F. Lefevour

[57] ABSTRACT

An improved reversible electric cell of the type which includes a soluble metal cathode, a chemically nonreactive electrode and an electrolyte comprising an aqueous solution of a metal halide is disclosed. The electrode is provided with open channels or grooves in which a dispersion, of paste-like consistency, is disposed. The dispersion or mixture comprises an inert conducting powder and an alkylammonium perchlorate. The alkylammonium perchlorate combines with the halogen released upon charging to form an addition product in a solid state. This prevents the halogen from being dissolved in the electrolyte during the charging cycle which would corrode soluble metal cathode and discharge the cell.

10 Claims, 5 Drawing Figures

INVENTOR
MARIO DE ROSSI

INVENTOR
MARIO DE ROSSI

INVENTOR
MARIO DE ROSSI

STORAGE BATTERIES CONTAINING ZINC HALIDE IN AN AQUEOUS SOLUTION OF THE TYPE HAVING A SOLUBLE CATHODE AND A DISSOLVED ANODE

Matter enclosed in heavy brackets [ ] appears in the original patent but forms no part of this reissue specification; matter printed in italics indicates the additions made by reissue.

RELATION TO PENDING APPLICATIONS

The present application is a continuation-in-part of U.S. Ser. No. 856,408, filed Aug. 9, 1969 now U.S. Pat. No. 3,625,764.

BACKGROUND OF THE INVENTION

1. Field of the Invention

The present invention relates to electric storage batteries and, more particularly, to an improved and unique reversible electric cell of the type having a soluble cathode, an insoluble positive electrode and an electrolyte comprising an aqueous solution of a metal halide.

2. Description of the Prior Art

As is well known in the art, electric storage batteries have been proposed which have high specific energy and a coefficient of utilization of active anodic and cathodic substances nearing unity. In general, such batteries are made up of a number of cells, each cell containing a metallic cathode, an aqueous electrolyte of a salt of a cathodic metal, with which the cathode reacts to form a soluble salt, and an anode dissolved in an electrolyte. The use of zinc or cadmium, as a metal for the cathode, and a halogen such as chlorine, bromine or iodine, as the dissolved anode, has been proposed. In such a system the aqueous electrolytic salt would be composed of a halide of the soluble cathodic metal, e.g., zinc bromide.

Such batteries have a number of advantages including a high specific energy in relation to the active mass. For example, in the case of the zinc-bromine pair, the electromotive force is about 1.82 volts with the theoretical specific energy being about 436 Wh/kg.

While a number of electric storage batteries have been proposed and have, to some extent, achieved commercial acceptance, known batteries suffer from certain disadvantages. For example, in such known batteries the aqueous solution at the end of the charging process (with the circuit open) contains a high percentage of halogen which attacks the cathodic metal, e.g., the zinc, chemically and thus causes autodischarge of the cell.

This disadvantage may be abdicated by preventing the electrolytic solution from entering into contact with the zinc when the latter is not required to furnish an electric charge. In addition, it has been proposed to introduce, in the recycling circuit of the electrolyte, an organic solvent which is not soluble in water and which is capable of retaining the halogen which has been liberated during the charging process. While such solutions have been proposed, it has been discovered that they are not always efficient and further require an increase in the mass of material not necessary to the electro-chemical reaction. In addition, auxiliary devices whose weight causes a diminuation of the value of the specific energy obtainable, are required. For example, in the case of the zinc-bromine pair, the theoretical specific energy drops from 436 Wh/kg to a real or actual value of less than 100 Wh/kg.

An example of a U.S. patent which discloses a battery or electric cell of the type described above is U.S. Pat. No. 2,566,114 to Bloch, which issued Aug. 28, 1951. In this patent the halogen is sought to be retained by the means of an alkylammonium halide, such as tetraethylammonium bromide. The electric cell disclosed by this patent suffers from the disadvantage that when the element is charged, i.e., when the alkylammonium halide has absorbed its maximum of halogen, the halogen is in contact with the zinc, which immediately causes an autodischarge of the element. Also, because of the formation of differences in density of the electrolyte, a lack of uniformity in the deposits is developed during the charge/discharge cycle which can damage the interior of the element.

SUMMARY OF THE INVENTION

The present invention relates to an improved electric cell in which the above-noted problems associated with known batteries (i.e., that of eliminating the halogen during the charging process and of restoring it in an elementary form during discharging process) are uniquely solved. In accordance with the invention, the positive electrode of the cell comprises an inert conducting mass which is in lateral contact with the electrolyte and in contact with a paste-like dispersion or suspension containing an alkylammonium perchlorate, preferably tetramethylammonium perchlorate, and a powdered conductive material, such as powdered graphite. Stated broadly the unique cell of the invention comprises a soluble metal cathode, preferably zinc, a chemically non-reactive electrode and an electrolyte comprising an aqueous solution of a halide of the cathodic metal, e.g., zinc bromide. The electrode is provided with open channels or grooves in which the aforementioned paste-like dispersion (as to be described in detail hereinafter) is disposed. An insulating screen may be positioned over the open channels or grooves so as to prevent dislocation of the homogeneous mixture of dispersion.

In its broadest aspect the present invention is based on the unexpected discovery that the alkylammonium perchlorate, dispersed or suspended in the paste-like mixture, combines with the halogen released upon charging to form an addition product in a solid state. This prevents the halogen from being dissolved in the electrolyte during the charging cycle and eliminates the problems associated therewith, i.e., corrosion of the zinc cathode and discharge of the cell.

It is accordingly a general object of the invention to provide a new and improved reversible electric cell that is not subject to the disadvantages of prior known devices.

Another and more particular object of the invention is to provide a new and improved electric reversible cell of the type comprising a zinc cathode, a chemically non-reactive electrode and an electrolyte comprising an aqueous solution of a zinc halide.

Yet another object is to provide a new and improved reversible electric cell that is relatively simple in construction, easy to manufacture and has a higher conductivity than prior known cells or batteries composed thereof.

BRIEF DESCRIPTION OF THE DRAWINGS

The manner in which the foregoing and other objects are achieved in accordance with the present invention will be better understood in view of the following detailed description and accompanying drawings which form a part of the specification, and wherein.

DESCRIPTION OF PREFERRED EMBODIMENT(S)

Figure 1:
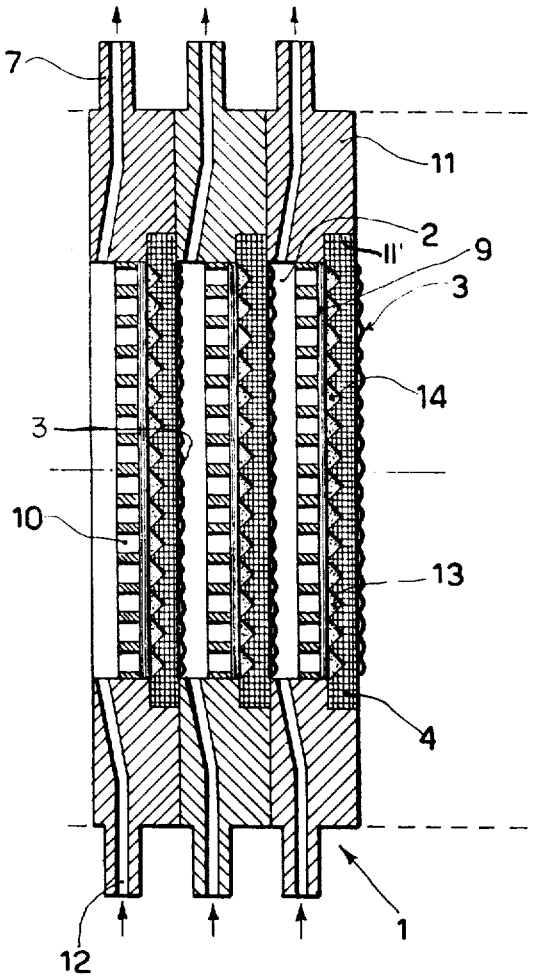
FIG. 1 is a sectional view of a first embodiment of the electric cell of the invention, three cells being shown in series.
Figure 2:
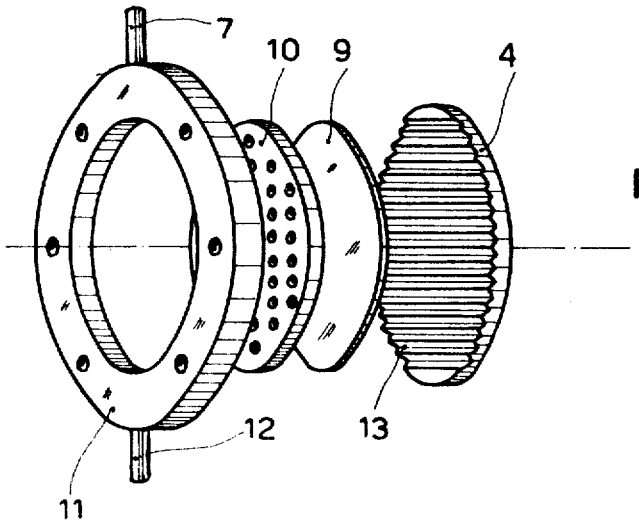
FIG. 2 is an exploded axial view of one of the cells shown in FIG. 1.
Figure 5:
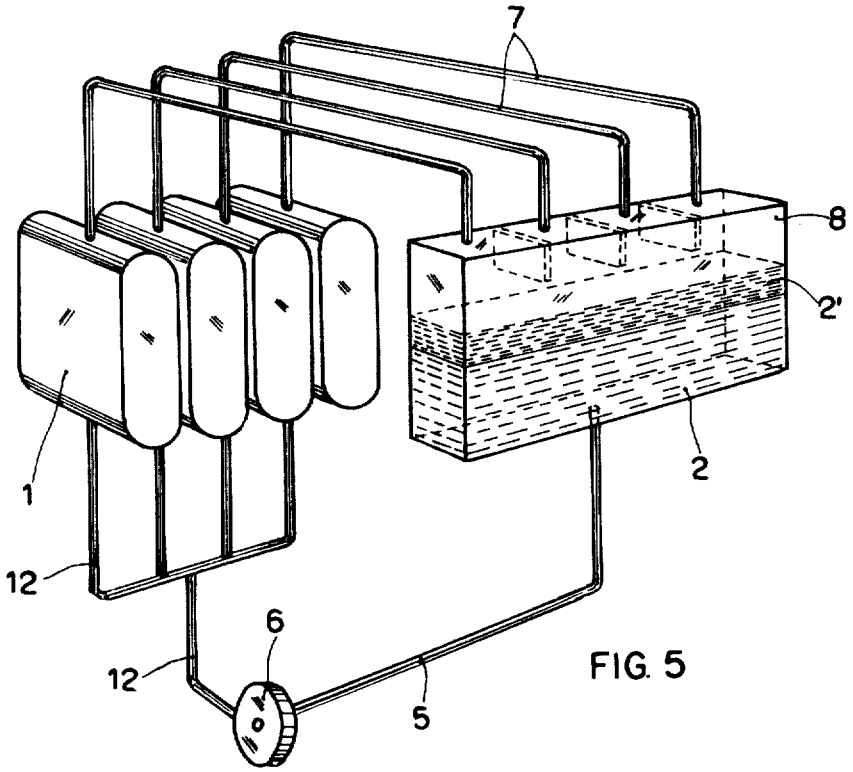
FIG. 5 is a perspective view of a series of capsule cells inserted in an installation for recycling the electrolyte in accordance with the present invention.

Turning now to the drawings in detail and first to FIGS. 1, 2 and 5, there is shown a first embodiment of the unique cell of the invention. As illustrated in FIGS. 1 and 2, a battery produced in accordance with the present invention comprises a series of reaction cells, indicated generally at 1. Each cell comprises a zinc cathode 3 forming the negative pole or electrode, and a neutral graphite cathode 4, forming the positive pole. As shown, the cathode 4 is closely linked to the cathode 3 of the adjacent cells. In the embodiment shown in FIGS. 1 and 2, the cathode-electrode complex is in the shape of a flat circular disk and is held in place inside the circular shaped washers 11. The latter, i.e., the washers 11, are non-conducting and are preferably made out of a plastic material. As illustrated, the washers are provided with a recess 11′ to secure or fit around the electrodes 4.

The washers 11 include conduits 7 and 12, for, respectively, the charge and discharge of the electrolyte 2. In this regard and with reference to FIG. 5, the electrolyte 2 is contained in a reservoir 8, which may be covered with an insulating layer 2′, made of an organic solvent, when the battery is not required to furnish electric current.

A conduit 5 (or series thereof) carries the electrolyte 2 from the reservoir 8 to the pump 6, which distributes the electrolyte through conduits 12 to the cells 1, when the battery is working.

As discussed above, the positive neutral electrodes 4 comprise a conducting solid mass, preferably made of graphite, which is in lateral contact with the electrolyte 2. In accordance with the present invention the conducting electrodes are provided with open channels or wedge-shaped grooves 13.

A mixture or paste-like dispersion of an alkylammonium perchlorate and a conducting powder, such as powdered graphite, is disposed and pressed within the interior of the open channels or grooves 13. The alkylammonium perchlorate is preferably tetramethylammonium perchlorate. However, other perchlorate salts, such as tetraethylammonium perchlorate, tetrabutylammonium perchlorate and cetiltrimethylammonium perchlorate may be employed.

It should be expressly understood that as used herein, the term "dispersion" does not refer to a solution but rather to a homogeneous mixture of paste-like consistency of the alkylammonium perchlorate and the powdered conductive material. The dispersion may be prepared by simply mixing the powders (each of the powdered graphite and perchlorate salt being in the solid form) and adding to this mixture a suitable solvent, such as the zinc bromide electrolyte itself. The electrolyte or solvent is added until a thick paste is formed having a consistency something like that of clay. It has been found that the particular ratios or amounts of the individual ingredients of the paste-like mixture is not critical. For example if powdered graphite is employed in preparing the mixture, it has been found that a convenient ratio of the alkylammonium perchlorate to powdered graphite is 3:5. However it again should be understood that this ratio may vary within wide ranges, as for example, from 1:5 to 5:1. The use of the powder of the inert conductive substance is not theoretically necessary. However, elementary halogen is nonconducting and when absorbed by a salt of, for example, tetramethylammonium perchlorate, forms a poor conducting layer on the surface of the electrode 4. This reduces the efficiency of the charging process. Thus the use of the powdered material is particularly advantageous.

In this regard, it has also been discovered that materials other than the conductive powder may be added to the dispersion or paste. While not critical, the use of e.g., charcoal in the dispersion causes the paste to be more porous and thus improves the working of the unique cell of the invention. When employed, a convenient ratio of the perchlorate, graphite and charcoal has been found to be 3:3:5. However, again this ratio may be widely varied and is not critical inasmuch as routine experimentation will quickly establish the quantities or ratios of material needed to form a paste of a particular consistency or one having a particular porosity, etc.

With reference again to FIGS. 1 and 2, the size and number of the annular channels or grooves 13 may vary widely and are established by the type of battery desired. For example, in order to obtain a slow discharge rate, widely spaced, broad grooves are preferred. Conversely, to obtain a rapid discharge rate, the grooves are preferably closer together and narrow.

After the dispersion has been prepared it is pressed or placed within the grooves or annular channels of the electrode in any convenient manner. A palette knife may be used for this purpose. However this may of course be done manually or by a suitable tool, etc. The amount of paste disposed within the grooves is not critical. Preferred ranges are from 5–10 grams per $dm^2$ (1 $dm^2$ permits a capacity of 3 to 5 Ah).

As illustrated in FIGS. 1 and 2 the mixture or paste may be pressed against the grooves 13 by a porous membrane 9. The latter, in turn may be held in place by a suitable diaphragm 10. The diaphragm as well as the membrane may be made of any suitable inert material, with plastic being the preferred material of construction.

Figure 3:
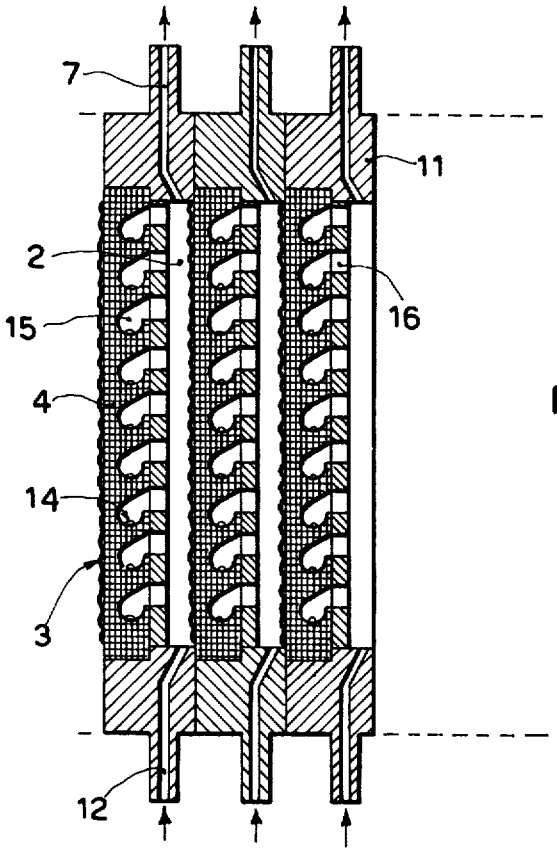
FIG. 3 is a sectional view of a second embodiment of the electric cell of the invention, three cells being shown in series.
Figure 4:
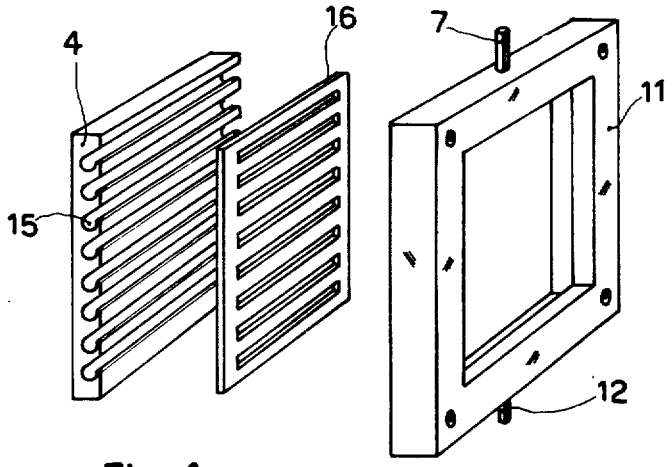
FIG. 4 is an exploded axial view of one of the cells shown in FIG. 3.

In the embodiment illustrated in FIGS. 3 and 4, the positive electrodes 4 are provided with rounded L-shaped channels 15. The paste-like dispersion or mixture indicated at 14, is preferably added to the channels 15 in such quantities that it does not completely fill the channels. An insulating screen 16 protects the effective surface of the positive electrode 4. In the design of FIGS. 3 and 4, the electrodes 4, washers 11 are square or rectangular in shape. As should be readily apparent the operation of the embodiment shown in FIGS. 3 and 4 is similar to that of the embodiment illustrated in FIGS. 1 and 2. There is one distinction however. This is that the alkylammonium perchlorate paste can be increased to the point where it absorbs more halogen, thus permitting storage of a larger capacity as well as a slightly internal resistance.

An exemplary zinc-bromine battery of the present invention would work as follows:

During the charging process, while the $Zn^{++}$ is being deposited on the cathode, the electrolytic solution containing the $Br^-$ ions comes into contact with the area of the positive electrode where, discharging the ions, it becomes elementary $Br_2$, which combines immediately with the alkylammonium perchlorate salt adhering to the plate. The electrolyte gradually weakens to become dilute zinc bromide solution until finally it becomes $H_2O$ and supporting conducting ions which take no part in the electro-chemical reaction.

During the discharge process, the Zn dissolves and forms, with the $Br_2$, $ZnBr_2$ which, deposited on the surface of the positive electrode, is soluble in the electrolyte.

As will be seen, this unique system avoids having $Br_2$ circulating in the whole of the cathode area where it could cause corrosion. Further, and very importantly, this system presents the following advantage: the restoration of the bromine during the discharging process is characterized by its extreme rapidity.

While not intending to be bound by any particular theory, it is felt that the alkylammonium perchlorate acts in a manner entirely different than materials employed in prior known electric cells, such as disclosed in U.S. Pat. No. 2,566,114 to Bloch. In this regard it is known that during the charging process, the bromide ions are discharged onto the positive electrode and become elementary bromine. The perchlorate e.g., tetramethylammonium perchlorate, is not very soluble, with the result that the alkylammonium ions ($TMA^+$) which go into solution are so few in number that they do not cause the precipitation of the first addition product, of the following ones which are formed at increasing potentials. Thus during the charging process, the last addition products are formed in a solid state, richer in bromine and less soluble than the tetramethylammonium perchlorate, and precipitate in solid form on the positive mass. In this way, either the charge potential or the discharge potential is maintained constant.

As will be appreciated by those skilled in the art, the present invention provides a truly remarkable and improved storage battery and cell design that is simple in construction and yet obviates the problem long sought to be solved by prior art workers. While particularly advantageous embodiments have been shown for illustrative purposes it should be understood that various modifications such as the shape or size of the electrodes 4, washers 11, etc., as well as the configuration of the grooves 13 and 15, may be made without departing from the scope of the present invention.

What is claimed is:

1. A reversible cell of the type which includes a zinc cathode, a chemically non-reactive electrode and an electrolyte comprising an aqueous solution of zinc bromide, the improvement in which the said electrode is in contact with said zinc bromide solution and with a conductive dispersion soaked in alkylammonium perchlorate which captures the bromine that is formed during the charging process, said electrolyte being capable of being removed from the cell when the cell is not in use and of being returned to the cell when the cell is in use.

2. A reversible electric cell which comprises a zinc cathode, an electrolyte formed of an aqueous solution of zinc bromide, a chemically non-reactive electrode which carries a dispersion of powdered graphite soaked in a salt, said salt selected from the group consisting of tetramethylammonium perchlorate and tetrabutylammonium perchlorate, said graphite electrode being in contact with said electrolyte and with said dispersion, said dispersion absorbing bromine during charging and restoring bromine during discharging.

3. An improved electric cell comprising a soluble metal cathode, selected from the group consisting of zinc and cadmium said metal having a high electromotive value; a chemically non-reactive solid positive electrode and an electrolyte formed of a solution of a halide selected from the group consisting of chlorine, bromine, and iodine, of said cathodic metal; said positive electrode having open channels in lateral contact with said electrolyte and having disposed therein a homogeneous conductive dispersion or suspension of an inert conductive powder and an alkylammonium perchlorate selected from the group consisting of tetramethylammonium perchlorate, tetrabutylammonium perchlorate, tetraethylammonium perchlorate, and cetiltrimethylammonium perchlorate.

4. The electric cell in accordance with claim 3 wherein said soluble cathodic metal is zinc, said solid positive electrode is graphite, said halide is bromine and said alkylammonium perchlorate is tetramethylammonium perchlorate.

5. The reversible electric cell in accordance with claim 3 wherein said alkylammonium perchlorate is tetramethylammonium perchlorate and wherein said conducting substance in powdered form is powdered graphite.

6. The reversible electric cell in accordance with claim 5 wherein said dispersion further includes charcoal.

7. The reversible electric cell in accordance with claim 3 wherein said open channels are wedge-shaped.

8. The reversible electric cell in accordance with claim 3 wherein said open channels are substantially L-shaped.

9. A battery including a series of reversible electric cells, said cells each comprising a zinc cathode, and a chemically non-reactive positive electrode, said positive electrode having a series of open channels therein, said channels being in lateral contact with an electrolyte formed of an aqueous solution of a zinc halide, said zinc halide selected from the group consisting of zinc bromide and zinc iodide, said channels further being in intimate contact with a paste-like mixture comprising an alkylammonium perchlorate and a conductive powder, said alkylammonium perchlorate in said mixture serving to combine with free halide during the charging cycle of said battery and form a solid addition product thereof and means for recycling said electrolyte to and from said series of cells for said battery.

10. The battery in accordance with claim 9 wherein said alkylammonium perchlorate is tetramethylammonium perchlorate and said conductive powder is powdered graphite.

* * * * *